(12) United States Patent
Bianchi

(10) Patent No.: US 10,165,721 B2
(45) Date of Patent: Jan. 1, 2019

(54) DISC HOLDER AND SCRAPER CONSTRUCTION FOR DISC HARROWS

(71) Applicant: BIANCHI S.r.l., Piadena (IT)

(72) Inventor: Sandro Bianchi, Piadena (IT)

(73) Assignee: BIANCHI S.R.L., Piadena (CR) (IT)

( * ) Notice: Subject to any disclaimer, the term of this patent is extended or adjusted under 35 U.S.C. 154(b) by 0 days.

(21) Appl. No.: 14/835,694

(22) Filed: Aug. 25, 2015

(65) Prior Publication Data

US 2016/0120092 A1   May 5, 2016

(30) Foreign Application Priority Data

Nov. 3, 2014   (IT) .............................. MI2014U0333

(51) Int. Cl.
*A01B 23/06*   (2006.01)
*A01B 21/08*   (2006.01)

(52) U.S. Cl.
CPC ............ *A01B 23/06* (2013.01); *A01B 21/086* (2013.01)

(58) Field of Classification Search
CPC ...................................... A01B 23/06
USPC ................................. 172/558, 566
See application file for complete search history.

(56) References Cited

U.S. PATENT DOCUMENTS

| | | | | |
|---|---|---|---|---|
| 395,994 A * | 1/1889 | Parmeter | ................ | A01B 23/06 172/164 |
| 682,505 A * | 9/1901 | Strong | ................... | A01B 15/18 172/558 |
| 837,491 A * | 12/1906 | Nelson | ................... | A01B 23/06 172/558 |
| 1,087,789 A * | 2/1914 | Lauterbach | ............ | A01B 23/06 172/558 |
| 1,474,906 A * | 11/1923 | Lindgren | ............... | A01B 15/16 172/566 |
| 3,213,514 A * | 10/1965 | Evans | ..................... | A01B 23/06 172/555 |
| 4,127,179 A * | 11/1978 | Heersink et al. | ...... | A01B 23/06 172/565 |
| 5,267,619 A * | 12/1993 | Eversole | ................ | A01B 23/06 172/572 |
| 6,412,571 B1 * | 7/2002 | McIlhargey | ......... | A01B 61/046 172/572 |
| 7,481,279 B2 * | 1/2009 | Blunier | .................. | A01B 23/06 172/509 |
| 7,631,701 B2 * | 12/2009 | Kromminga et al. | . | A01B 23/06 172/508 |
| 7,984,768 B2 * | 7/2011 | Schilling | ............... | A01B 23/06 172/566 |

* cited by examiner

*Primary Examiner* — Thomas B Will
*Assistant Examiner* — Joel F. Mitchell
(74) *Attorney, Agent, or Firm* — Hoffman & Costigan, P.C.; James V. Costigan; Kathleen A. Costigan

(57) ABSTRACT

A disc holder and scraper construction for disc harrows comprises a disc element fixed to a rotary hub, which is supported by a disc holder spring in turn fixed to a framework of a disc harrow, the disc holder construction further comprising a scraper assembly for removing soil adhering to a disc element, the scraper assembly being affixed to a flexible disc scraper arm, which is in turn affixed to the disc holder spring; the disc scraper arm, affixed to the disc holder spring and not to the harrow framework, supports the scraper assembly and is driven in a timed manner with respect to the disc element.

4 Claims, 4 Drawing Sheets

DISC HOLDER AND SCRAPER CONSTRUCTION FOR DISC HARROWS

BACKGROUND OF THE INVENTION

The present invention relates to a disc holder and scraper construction for disc harrows.

As is known, a disc harrow is an agricultural machine supported or towed by a tractor and is used for complementary agricultural works, typically for harrowing soil.

A conventional disc harrow comprises a plurality of harrow discs which are fixedly clamped on an axle.

More specifically, said harrow discs are affixed to the machine framework by disc bearing or holder spring elements.

In this manner, all the disc elements are independent from one another and are adapted to fit the soil depressions.

Thus, to the soil breaking and mixing operation performed by the disc elements, a further resilient action is added, due to the springs, which generate a vibration pattern improving the soil cultivating process.

However, as the soil has particular soil features or includes a some amount of moisture, it tends to adhere to the disc element surfaces.

In conventional disc harrows, of a fixed axle type, a plurality of scraping lugs, rigidly coupled to the machine framework, support a corresponding plurality of scraper elements which clean off, by scraping, the disc.

The prior devices including a disc holder spring, related disc and hub do not comprise a system for removing soil adhered to the discs due to the mentioned soil characteristics and moisture.

SUMMARY OF THE INVENTION

The aim of the present invention is to provide a disc holder construction overcoming the above mentioned prior art drawbacks.

Within the scope of the above mentioned aim, a main object of the invention is to provide such a disc holder construction including a scraper assembly for removing soil from the disc elements, the disc holder spring being adapted to be freely bent to fit the soil or ground depressions.

Another object of the present invention is to provide such a construction which, owing to its specifically designed structural features, is very reliable and safe in operation.

The above mentioned aim and objects, as well as yet other objects, which will become more apparent hereinafter, are achieved by a disc holder and scraper construction for disc harrows, characterized in that said construction comprises a disc element fixed to a rotary hub, which is supported by a disc holder spring in turn fixed to a framework of a disc harrow.

According to the present invention, the above disc holder construction comprises a scraper assembly for removing soil adhering to a said disc element.

Said scraper assembly being affixed to a flexible disc scraper arm, which is in turn affixed to the disc holder spring.

The disc scraper arm, affixed to the disc holder spring, and not to the machine framework, supports the scraper assembly and is driven in a timed manner with respect to the disc element.

BRIEF DESCRIPTION OF THE DRAWINGS

Further characteristics and advantages of the present invention will become more apparent hereinafter from the following disclosure of a preferred, though not exclusive, embodiment of the invention which is illustrated, by way of an indicative but not limitative example, in the accompanying drawings, where.

DESCRIPTION OF THE PREFERRED EMBODIMENTS

Figure 1:
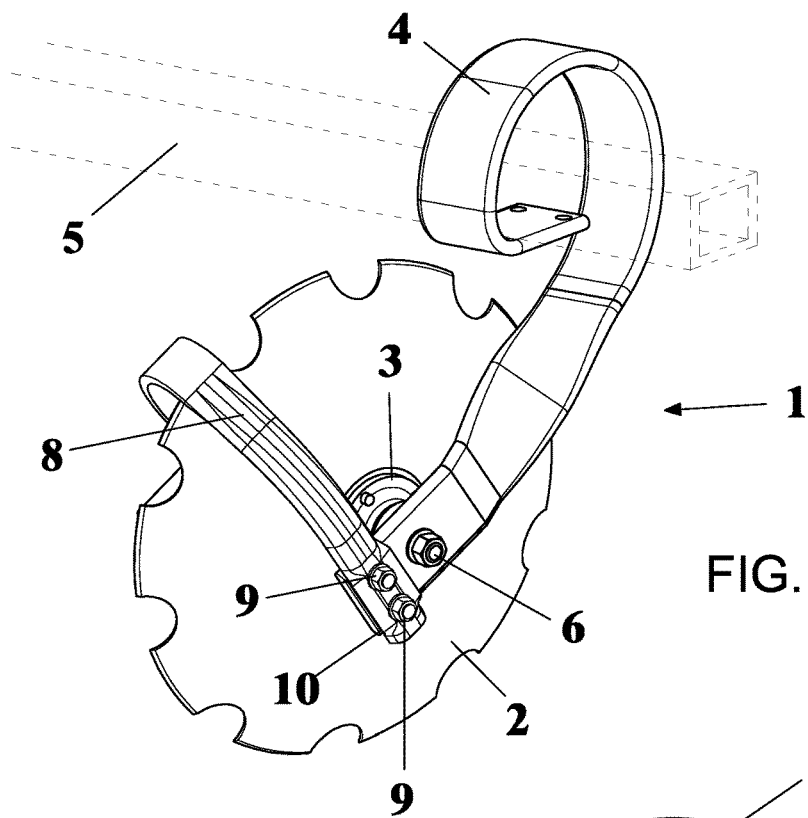
FIG. 1 is a perspective view of a rear portion of the overall device, being shown in a use condition thereof, according to the machine feeding direction, on a side of the hub.
Figure 2:
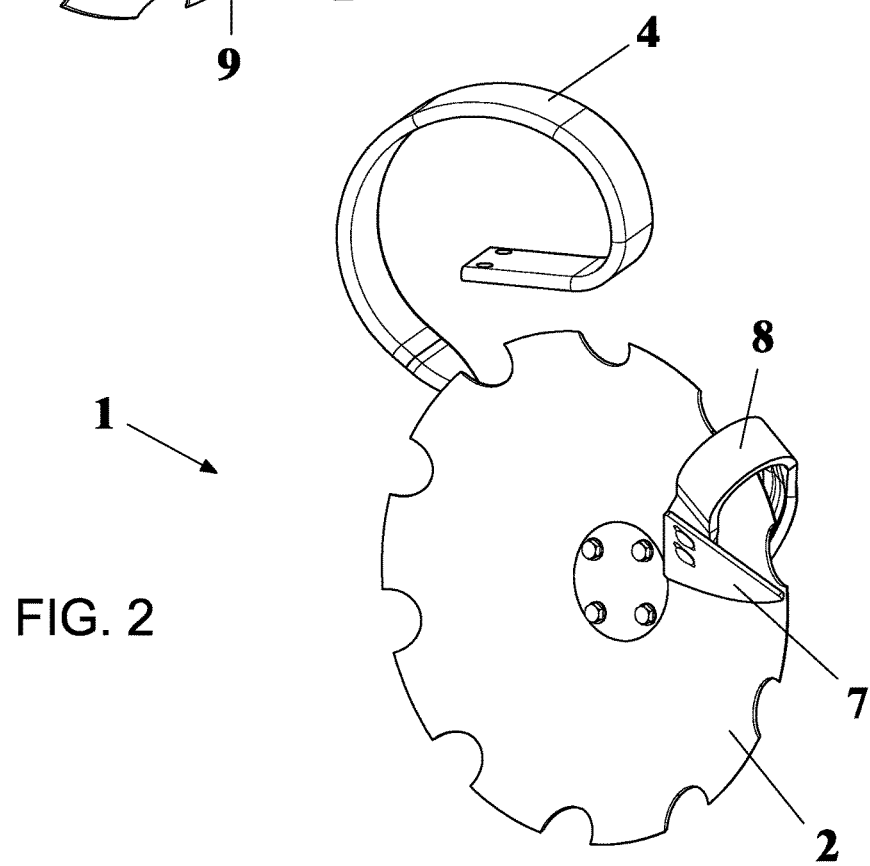
FIG. 2 is a perspective view of the device, taken on a side of the scraper assembly.
Figure 1A:
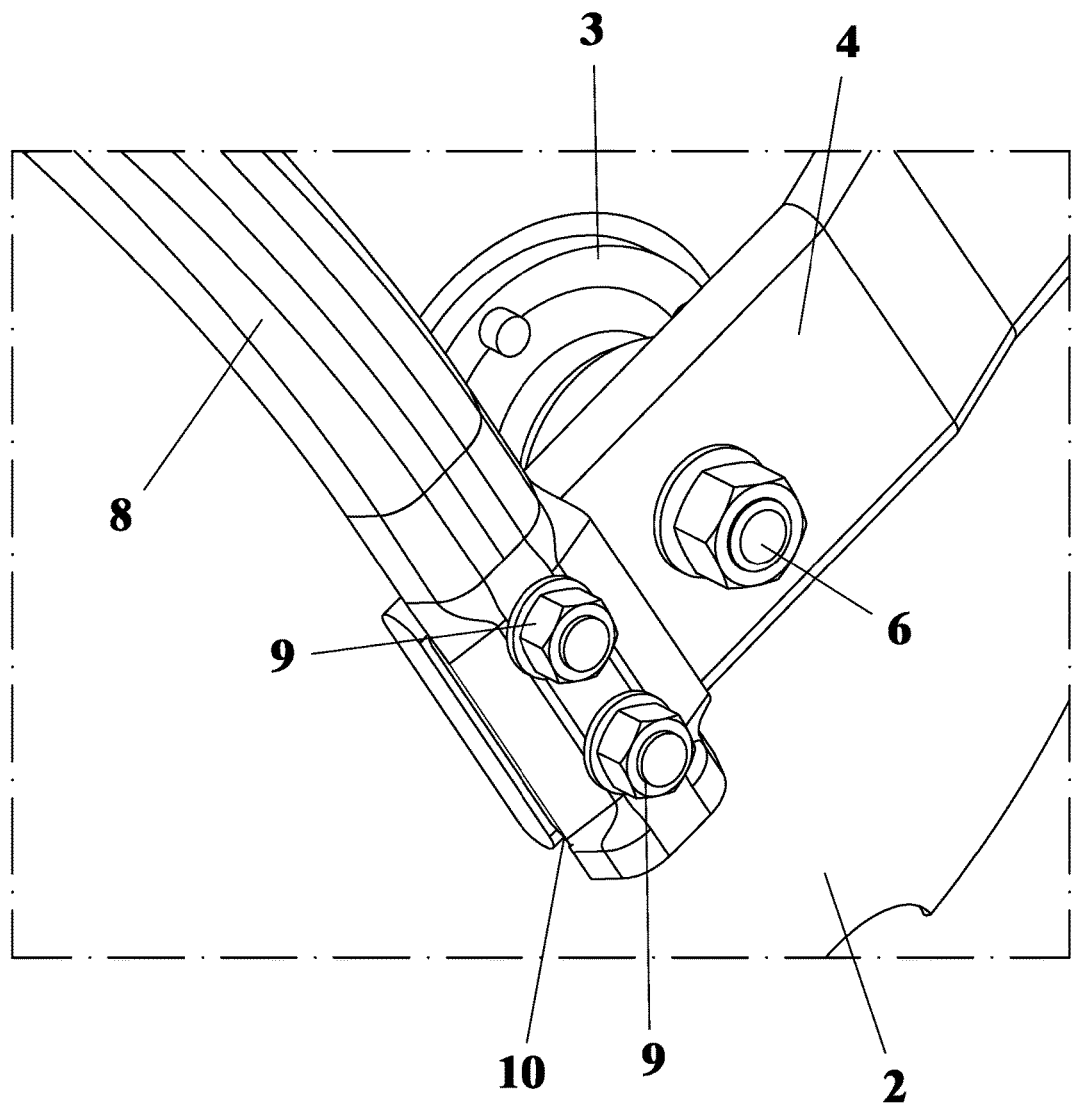
FIG. 1A is a perspective view of the device taken on a side of the disc element which shows the connection of the disc scraper arm to the disc holder spring and the hot molded recess 10.
Figure 1B:
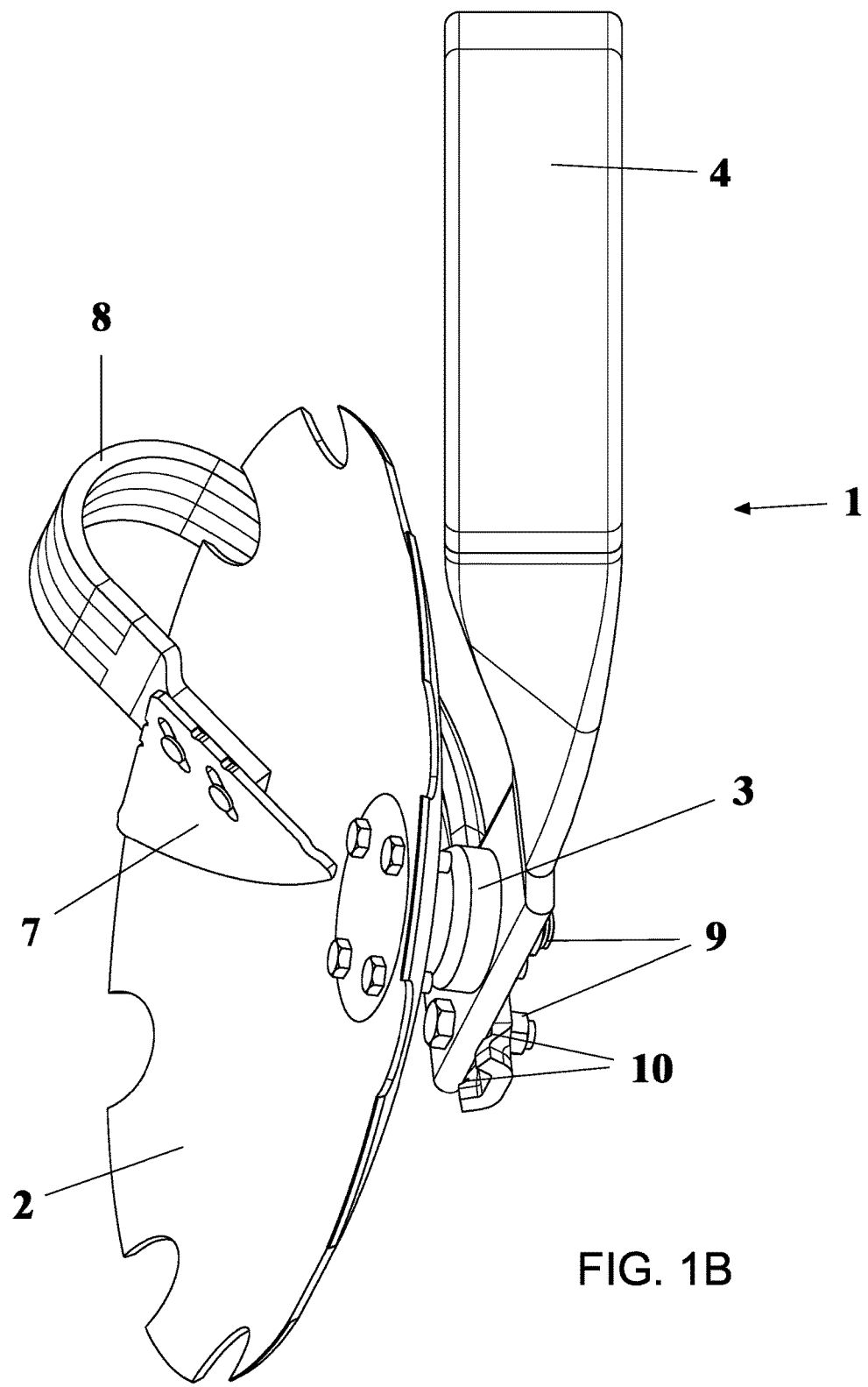
FIG. 1B is a perspective view of the device on a side of the disc element showing the disc mounted on the disc holder spring and the hot molded recess 10 of the disc scraper arm which is mounted on the disc holder spring.
Figure 3:
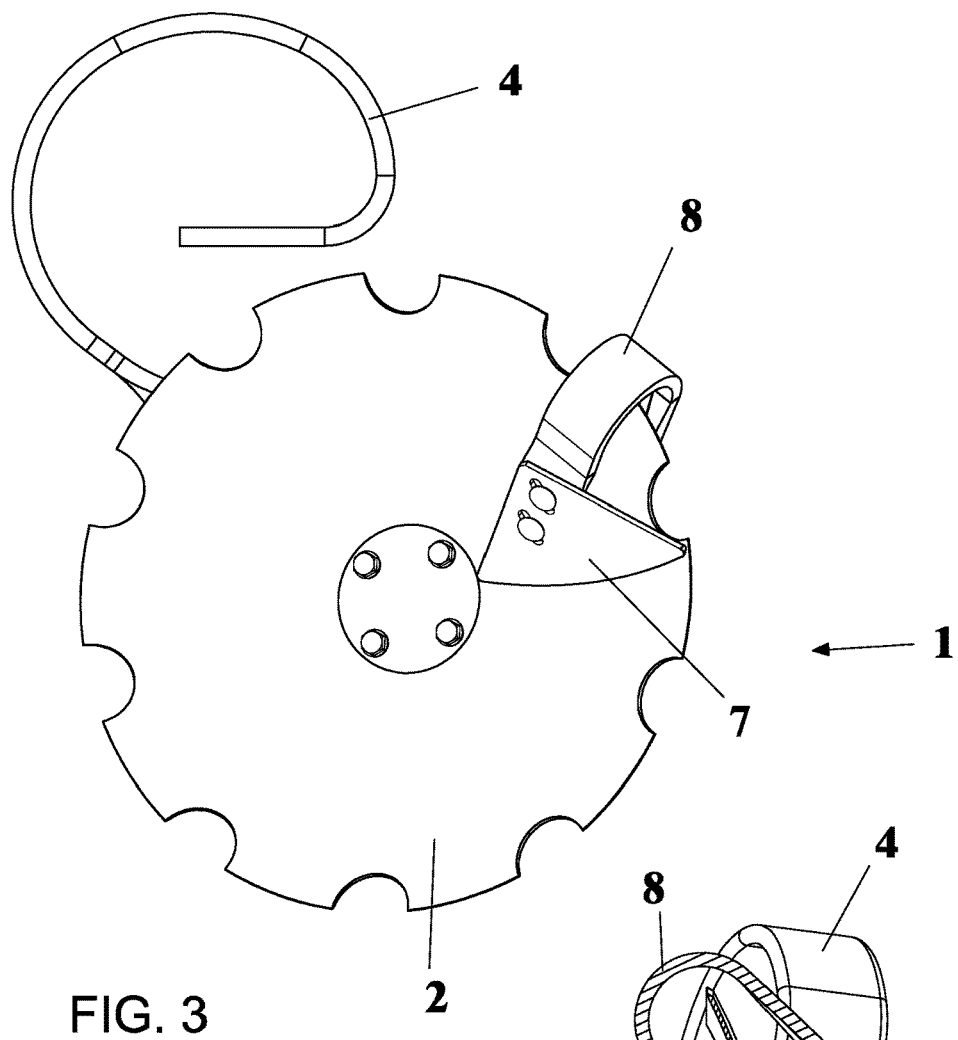
FIG. 3 is a side view of the device, taken on a side of the disc element.
Figure 4:
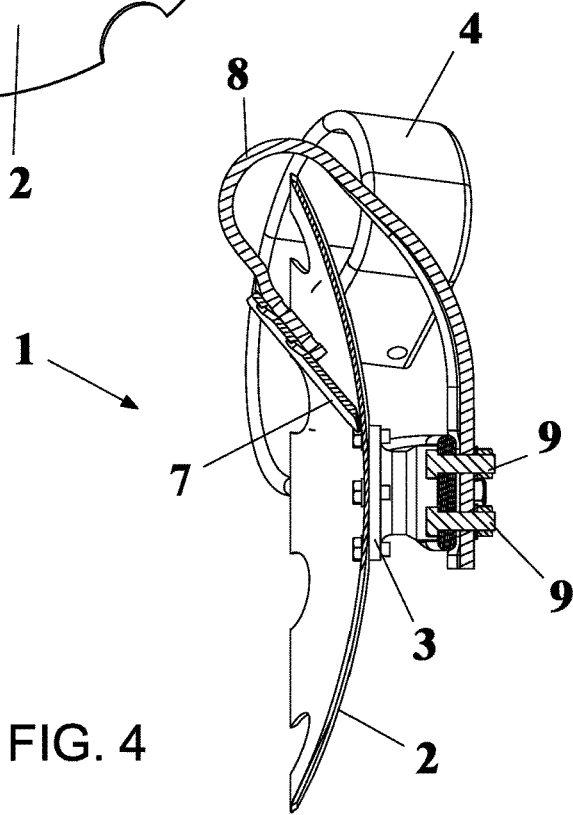
FIG. 4 is a partially cross-sectioned rear view of the device.

With reference to the number references of the above mentioned figures, the disc holder construction according to the present invention, which has been generally indicated by the reference number 1, comprises a disc element 2 fixed to a rotary hub 3 which is supported by a disc holder spring 4 in turn affixed to a longitudinal bar 5 of a disc harrow, not shown in the figures.

The rotary hub 3 is affixed to the disc holder spring 4 through a pivot pin and a corresponding nut 6.

According to the present invention, the disc holder construction 1 comprises a scraper assembly 7 for removing soil adhering to the disc element 2.

Said scraper assembly 7 is affixed to a disc scraper arm 8 which, in turn, is affixed to the disc holder spring 4 by clamping bolts 9.

According to the present invention, said disc scraper arm 8 is affixed to the disc holder spring 4 but not to the harrow framework, and supports the scraper assembly 7 which is driven in a timed manner with the disc element 2.

Said disc holder spring 4, to which said disc scraper arm 8 is clamped, has been so configured and extended, in comparison with a conventional disc holder spring, to form the disc scraper arm attachment part and related clamping holes.

The construction according to the present invention, with a like or corresponding shape but with multiple size patterns, may be applied to all the systems formed by a suitably arranged disc holder spring, a hub and a disc element.

Advantageously, the disc scraper arm 8 comprises a recess 10, which is made by a hot molding operation, encompassing the disc holder spring 4 to prevent said disc scraper arm from being laterally offset.

Advantageously, said disc scraper arm 8 has a curved configuration to be properly housed in a concealed portion of the construction, without hindering the soil processing operations.

Preferably, said disc scraper arm 8 is made of a spring steel material, which has been subjected to a thermal processing for allowing the disc scraper arm to operate as a spring element proper, designed for supporting impacts and flexures from large soil clods or stones.

It has been found that the invention fully achieves the intended aim and objects.

In fact, the invention has provided a disc holder construction solving the problem of supporting the scraper assembly for removing adhering soil from each harrow disc in an individual manner, while said disc holder spring may be freely deflected to fit the soil or ground depressions.

In practicing the invention, the used materials, as well as the contingent size and shapes, can be any, according to requirements.

The invention claimed is:

1. A disc holder and scraper construction (1) for disc harrows, characterized in that said disc holder and scraper construction (1) comprises a disc element (2) affixed to a rotary hub (3), supported by a disc holder spring (4) to which is affixed a flexible disc scraper arm (8), made of spring steel, at a hot molded recess (10) on said disc scraper arm (8) made of spring steel, where said recess (10) engages said disc holder spring (4) at a point adjacent to a point of attachment of said rotary hub (3) to said disc holder spring (4), wherein said hot molded recess (10) prevents said flexible disc scraper arm (8) made of spring steel from being laterally offset and; wherein said disc holder spring (4) is in turn affixed to a framework (5) of a disc harrow, said disc holder spring (4) and said disc scraper arm (8) made of spring steel, being mounted on a convex side of said disc element (2), said disc holder and scraper construction (1) being adapted to remove soil adhering to said disc element (2) by a scraper assembly (7) affixed to said flexible disc scraper arm (8) made of spring steel so that said scraper assembly (7) will move when said flexible scraper arm (8) made of spring steel moves.

2. A disc holder and scraper construction, according to claim 1, characterized in that said flexible disc scraper arm (8) has a curved configuration allowing said flexible disc scraper arm (8) to be arranged in a concealed portion of said disc holder and scraper construction (1), without hindering a soil processing operation.

3. A disc holder and scraper construction, according to claim 1, characterized in that said rotary hub (3) is affixed to said disc holder spring (4) by a pin-nut assembly.

4. A disc holder and scraper construction, according to claim 1, characterized in that said flexible disc scraper arm (8) is made of a thermally processed spring steel material allowing said flexible disc scraper arm (8) to operate as a spring element that is adapted to absorb impacts from large clods or stones.

* * * * *